3,007,844
WOOD-PRESERVING AGENT
Wolfgang Otto Schulz, Sinzheim, Kreis Buhl, Germany, assignor to Allgemeine Holzimpragnierung Dr. Wolman G.m.b.H., Sinzheim, near Baden-Baden, Germany
No Drawing. Filed Apr. 13, 1959, Ser. No. 805,684
7 Claims. (Cl. 167—38.5)

This invention relates to impregnating agents for the preservation of woods of all kinds.

It is an object of my invention to provide a wood-preserving agent for impregnating woods of all kinds, which agent is suitable for use in all known wood-impregnating methods and whereby impregnated wooden articles such as beams and the like are obtained which are practically non-poisonous regardless of their being stored ready for use, built in a wooden structure, or in the form of waste woods, chips, sawdust, etc.

It is a further object of my invention to provide an impregnating agent for preserving woods or all kinds, which agent is characterized by preliminary fixation in the wood and by leaving the fibers of the treated wood unaffected, in contrast to the known copper- and ammonia-containing impregnating agents, so that the bending strength of the wood remains practically unimpaired by the impregnating treatment.

It is well known in the art of preserving woods to use compounds of zinc, copper, and boron as the impregnating agent. However, salts of copper and zinc such as copper sulfate or zinc chloride suffer from the drawback that they remain practically ineffective against several important wood-destroying fungi. For instance, it is known that copper sulfate is ineffective against *Poria vaporaria*. This is described, for example, in the Handbook "Wood Preservation During the Last 50 Years," Dr. H. Broese van Groenau, H. W. L. Rischen, Dr. J. van den Berge (Leiden 1951), page 113. It is also disadvantageous that impregnation with copper sulfate or zinc chloride leads only to an unsatisfactory "fixation" of the impregnating agent in the wood. Furthermore, zinc chloride has an unfavorable influence on the fibers of the wood due to the formation of free hydrochloric acid by the hydrolytic cleavage of the salt. (Described in the handbook supra on pages 122 and 123.)

An improvement of the fixation of copper and zinc in the wood has been obtained by means of wood-preserving agents containing beside copper and/or zinc also alkali metal dichromate and arsenic acid. Such agents are commercially available under the names of ASCV, Green salts (see U.S. Patent 2,106,978), Boliden salts (see U.S. Patents 2,139,747 and 2,202,579), and others. While these agents have the advantage of a high degree of fixation of copper and/or zinc and arsenic in the wood in the form of copper or zinc arsenates, respectively, the agents and the resulting impregnated woods suffer from the serious drawback of being very poisonous to warm-blooded animals and human beings due to the high arsenic content of these impregnating agents.

Other copper-containing wood preserving salt mixtures are available commercially under the name of "Celcure" and others (see U.S. Patents 1,684,222 and 2,041,655). These agents contain alkali metal dichromate, chromic acetate, acetic acid as well as copper sulfate. Prosphates and boric acid may also be added to these salt mixtures, in order to reduce the inflammability of the woods impregnated therewith.

Fixation of the agent in the wood is achieved due to the formation of chromate of monovalent copper, $Cu_2CrO_4$, and of basic chromates of bivalent copper-fixation is completed by treating the impregnated wood with steam. Nevertheless, the absorbed impregnant is not very stable against lixiviation and shows, after lixiviation, very high "limit concentrations," for instance, up to 41 kilograms per cubic meter (kg./m.$^3$) of wood against *Coniophora cerebella*, below which limit concentrations the agent is no longer sufficiently effective.

Copper has also been introduced into wood, paper, and products made therefrom, such as fiber plates, by impregnation of these materials and articles with copper formiate (German Patent 1,014,310), whereupon fixation of the copper on the fibers has been effected by treatment with steam at temperatures between 100 and 200° C. Other wood-preserving agents are known which contain boron in special compositions of complex boron fluorides with bichromates or monochromates and alkali metal arsenates. The aforesaid complex boron fluorides may also be replaced by correspondingly composed mixtures of bifluorides and boric acid, from which the complex boron fluorides are formed when the mixtures are dissolved in water. The fixation of these last-mentioned agents in the wood leads to the formation of chromium cryolite and chromic arsenate. This is described in the Austrian patent application A6920–55/38d–2/01.

Furthermore, a method for impregnating wood with iron and zinc borates has been suggested (German Patent 110,967). The wood to be impregnated is boiled in boric acid- and/or borax-containing solutions in the presence of iron turnings or chips or metallic zinc.

Water-soluble double salts are thus formed which may be designated as sodium zincate or sodium ferrate and penetrate as such into the wood during the boiling treatment. The drawback of this method is that the impregnation must be carried out at boiling temperatures in the presence of metallic zinc or iron. As a consequence, this method cannot be used in modern impregnating processes.

Certain types of wood are difficult to impregnate due to the slow penetration of the preserving agent into the wood; in particular, spruce or pine wood pertain to these woods which have gained importance in the production of masts for ships and the like. Furthermore, this method is uneconomical in that it requires increased energy consumption for the necessary boiling treatment.

It is also known to dissolve zinc and copper borates, or mixtures of zinc or copper salts with borax, in the presence of an excess of copper hydroxide or zinc hydroxide in aqueous ammonia, and to use the resulting solutions as wood-preserving agents. These ammoniacal solutions may also contain phosphates and/or carbonates (see, for instance, U.S. Patent 2,194,827). This method suffers from the serious drawback that ammoniacal copper solutions are excellent solvents for cellulose and are in fact used as such in the cellulose-processing industries and in chemistry, for instance, as Schweitzer's Reaction. Consequently, these agents reduce the mechanical stability of the impregnated wood, in particular, its bending resistance or buckling strength, and have therefore not found acceptance for the preservation of wood on an industrial scale. This is described in Mahlke-Troschel-Liese "Handbuch der Holzkonservierung" (Berlin/Gottingen/Heidelberg, 1950) 3rd edition, page 354, third paragraph, and also in the Handbook "Wood Preservation . . ." supra on page 116. As a further disadvantage, these agents can only be produced in the form of their solutions and, as a further drawback, the fixation velocity of these agents in the wood depends exclusively from the high evaporation velocity of the ammonia contained therein. Therefore, these ammoniacal solutions are not well suited for all osmotic impregnation processes such as the well-known paste process, because in these processes, the evaporation of ammonia from the relatively large surface of the wood takes place more rapidly than the slower diffusion of the dissolved salt into the wood, in particular, into pine or spruce. The aforegoing description of the state of the art will reveal that many attempts have been made unsuccessfully to find a wood-preserving agent that is satisfactory in all of the various aspects described hereinbefore and avoids the several drawbacks of the different known wood-preserving agents.

The wood-preserving agents according to my invention avoid these drawbacks and permit attaining the objects stated hereinbefore in that these agents are difficultly lixiviable fungicide and insecticide agents characterized by containing hexavalent chromium and such difficultly water-soluble heavy metal borates, the metal cations of which form with the hexavalent chromium soluble chromates and bichromates, respectively; such heavy metal borates being, in particular, zinc, copper and manganese borates.

Apart from these, it would probably be possible to use cadmium borate, chromium borate, molybdenum borate, tungsten borate, ferrous borate, nickel borate, and cobalt borate; probably borates of trivalent heavy metals, for instance, aluminum borate and ferric borate could also be used, but are difficult to obtain and perhaps of little industrial importance.

When referring to "borates" I include the metaborates; for instance, I refer to $Cu(BO_2)_2$ as copper borate.

The problem that is solved by the present invention consisted in dissolving the difficultly water-soluble heavy metal borates in such a manner that they can be applied preferably in all modern processes of wood preservation and, furthermore, if copper borate is used, to prepare the solution of the latter in such a manner that the treated wood does not suffer any damage to its fibers. More specifically, it is the problem solved by my invention to dissolve the metal borates in such a manner, or cause the formation of metal borates in the wood in such a way, that the fungicidal and insecticidal properties, as well as the low lixiviability which is inherent to the metal borates, is preserved or reestablished in the impregnated wood.

According to an important feature of my invention, I therefore use for dissolving the metal borates, such acids or acidically reacting substances as are degraded in the wood under formation of other substances which are at least neutral or even alkaline and are thus capable of binding the acids added to the wood-preserving agent. Among these acids and acidically reacting substances I use, in particular, chromic acid or mixtures of an alkali metal dichromate or monochromate salt with a medium-strong to very-strong acid or acidic substance such as, for instance, sulfuric acid, sodium bisulfate, hydrofluoric acid, or similar substance having, in aqueous solution, hydrogen ion concentrations corresponding to the same pH range as medium-strong to very-strong acids.

By medium-strong acids or acidic substances, I mean substances having, in aqueous solution, a dissociation constant above $10^{-4}$, and by strong acids I mean acids having a dissociation constant, in aqueous solution, above $10^{-1}$.

According to a particularly advantageous embodiment of the invention, metal borates are produced in situ in the wood under treatment. As starting materials, I prefer to use zinc-, copper- or manganese-compounds dissolved in chromic acid. The respective metal borate is then formed by a double reaction of one mole of the copper or zinc or manganese salt dissolved in chromic acid with the corresponding stoichiometrical amount of at least two gram atoms of boron for every mole of the heavy metal salt, by adding to the solution either boric acid or boric acid anhydride.

Impregnating solutions according to the invention can, therefore, be prepared in two ways:

(I) One mole of a substantially water-insoluble metal borate in the dry state is intimately mixed with $x$ moles of chromic acid, $x$ being greater than 1.8. The aqueous solution is then used for impregnating wood or products produced from wood, such as fiber plates and the like. Of course, the free chromic acid may also be produced in the solution by adding to the same, instead of the $x$ moles of chromic acid, a corresponding amount of equivalent mixtures of alkali metal bichromate or monochromate with a strong acid or with a compound hydrolyzing in aqueous solution under the formation of strong acids. Thus, it is well known to any chemist that two moles of chromic acid will be obtained when dissolving one mole of alkali metal bichromate and one mole of sulfuric acid in water. Also, the one mole of sulfuric acid mentioned in the latter mixture can be replaced by one mole of alkali metal pyrosulfate or by two moles of alkali metal bisulfate.

(II) One mole of a compound of copper, zinc or manganese soluble in chromic acid is combined with $x$ gram atoms of hexavalent chromium in the form of chromic acid or alkali metal salts of chromic acid, i.e., monochromates or bichromates, $x$ having values between about 1.8 and 3; and there are further added two gram atoms of boron in the form of boric acid, boric acid anhydride, or alkali metal borates.

These three compounds are dissolved in water to obtain a concentration of metal borate equivalent to that mentioned under I.

The limit value of 1.8 given for $x$ in the above compositions under I and II has been empirically determined as that value at which the heavy metals are still dissolved in chromic acid solution, preferably as bichromates, while monochromates, i.e., chromates produced when $x$ is smaller than 1.8, would not be soluble in chromic acid solution. On the other hand, the maximum value for $x$ has been stated to be 3 because above that limit value the concentration of chromium hydroxide in the wood becomes so strong that the fungicidal activity of the impregnant in the wood is adversely affected.

It will be understood that the concentration of the composition according to the invention in aqueous solution can be varied within very wide limits and will be adjusted to the desired concentration conventionally required in the known modern impregnating methods, and will also depend on the kind of wood to be impregnated.

Care must be taken that the preserving agent or the impregnant aqueous solution of the same according to my invention, is free from any acids and/or acid anions which might reduce or even completely suppress the fixation process of the fungicidal or insecticidal components of the agent in the wood. Thus, all acidically reacting substances must be excluded from the compositions and solutions according to the invention, which would have a tendency to form complex compounds with the cations of the metal borates forming one of the main components of my compositions, (such as copper borate or zinc borate) or which acidic substances may become oxidized by chromic acid or chromate ions. Thus, I have found that all organic acids must be excluded from my compositions. This rule is even valid, and this is particularly surprising, for such aliphatic acids are resistant to hexavalent chromium, for instance, acetic acid and propionic acid. I believe that the reason for the necessity of excluding, for instance, acetic acid, from my compositions is probably due to the fact that acetic acid forms acetates with the trivalent chromium being formed in the wood, as well as with many heavy metals, including copper, which acetates have a tendency to be converted into basically reacting, complex acetates or hydroxides when in contact with water, and under cleaving off acetic acid. Now, since boric acid is one of the weakest known acids, the hydrolytically formed acetic acid would react with the heavy metal borate, for instance, copper borate, under formation of copper acetate and free boric acid, which latter could then easily be leached out of the wood. The wood would thus soon lose its protection against fungi and insects. Moreover, the heavy metal acetate would in turn be hydrolyzed by water and cleave off acetic acid under formation of basic, difficulty soluble heavy metal acetates such as, for instance, basic copper acetate. I have found by careful experiments that the fixation of boron in the wood is practically eliminated by even very small admixtures of acetic acid, while the heavy metal component remains practically unleachable. It cannot be stated at present with certainty whether, at the end of the reaction, the heavy metal, for instance, copper, is present in the wood in the form of copper hydroxide or a difficultly soluble basic copper acetate. However that may be, the admixture of aliphatic acids causes an increase in the lixiviability of boron from the treated wood which leads in wood preserving practice to a strong increase of the limit concentrations required after lixiviation against those fungi which are resistant to the heavy metal compound but particularly sensitive to the boron compound of the composition according to my invention. Thus, admixture of acetic acid to the composition according to my invention will greatly increase, for instance, by two-times, the limit concentration required, after lixiviation of the impregnated wood with water, against the fungus *Poria vaporaria*.

Among the inorganic acids that must be excluded from the compositions according to my invention, I mention particularly arsenic acid and phosphoric acid. The reason for excluding these acids is that they would replace the weak boric acid in the metal borates, for instance, of copper or zinc, under formation of arsenates, phosphates of zinc or copper, which are even less soluble than the borates.

Inorganic acids and acidic substances that may be used in the compositions according to the invention are, for instance, sulfuric acid, sodium bisulfate, ammonium bisulfate, potassium bisulfate, sodium pyrosulfate, potassium pyrosulfate, ammonium pyrosulfate, hydrochloric acid, nitric acid, hydrofluoric acid, hydrobromic acid, but no acids of reducing properties such as sulfurous acid.

I have further discovered that, surprisingly enough, the limit concentrations of the wood-preserving agent required for making the wood resistant to fungi and insects of all kinds can be further improved by increasing the boron content of the composition according to my invention beyond the two moles of boric acid stoichiometrically required for the formation of one mole of copper borate or zinc borate to such a degree that for every chromium atom present in the composition there remain up to two atoms of boron available in the form of boric acid or boric acid anhydride. Preferred compositions according to my invention, therefore, contain for one mole of a heavy metal compound soluble in chromic acid, from 2 to $2x$ plus 2 gram atoms of boron in the form of free boric acid or boric acid anhydride or of equivalent mixtures of alkali metal borates or ammonium borate with inorganic acids, and furthermore, either $x$ moles of free chromic acid or of mixtures formed $x$ moles of alkali metal chromates or bichromates with acidic substances forming the corresponding number of $x$ moles of chromic acid when dissolved in water; $x$ having values between 1.8 and 3.

As heavy metal compounds there may be used preferably the oxide, hydroxide, or carbonate of zinc, or divalent copper, or of divalent manganese.

Other heavy metal compounds soluble in chromic acid which are also suitable for use in the compositions according to my invention are the nitrates, sulfates and chlorides of zinc, divalent copper or divalent manganese. When using the latter type of heavy metal compounds, I neutralize the acid set free through hydrolysis of the heavy metal salt when dissolved in water, by adding to the solution for each mole of heavy metal salt one mole of alkali metal bichromate or alkali metal monochromate.

If the chromium compound in the composition according to my invention is free chromic acid, I prefer to neutralize the above-mentioned acid set free by dissolution of the heavy metal salt in water, by adding to the composition either one mole of alkali metal tetraborate or ammonium tetraborate, or two moles of alkali metal metaborate or ammonium metaborate per mole of heavy metal salt.

The term of chromic acid as used hereinbefore and in the claims also includes chromic anhydride ($CrO_3$) in its crystalline form. Alkali metals according to the invention refer, for obvious economical reasons, principally to sodium and potassium, while the use of lithium salts as a chemical equivalent shall not be excluded.

My invention will be further illustrated by a number of examples, which are, however, not to be construed in any way or form as limitative of the scope of the invention.

Example I

A wood-preserving agent according to the invention is prepared by admixing one mole of copper borate and 2.2 moles of chromic anhydride. The resulting mixture, which may become pasty in the presence of moist air, is free from any excess of boron. Its percentage composition is:

40.4% _____ $Cu(BO_2)_2$.
59.6% _____ $CrO_3$.

Example II

In the formula of Example I, copper borate is replaced by manganese borate ($MnH_4(BO_3)_2$).

Example III

Copper borate in Example I is replaced by zinc borate ($Zn(BO_2)_2$).

Example IV

Copper borate in the composition of Example I is replaced by a mixture of one-half mole of copper borate and one-half mole of zinc borate.

Example V

A wood-preserving composition according to my invention is prepared from one mole of manganese borate, one mole of boric acid, and two moles of chromic anhydride. This composition contains an excess of one mole of boric acid and has the following percentage composition:

42.6% _____ $MnH_4(BO_3)_2 \cdot H_2O$.
43.8% _____ $CrO_3$.
13.6% _____ $B(OH)_3$.

Example VI

Manganese borate in the composition of Example V is replaced by zinc borate.

Example VII

Manganese borate in the composition of Example V is replaced by copper borate.

Example VIII

One-half mole of manganese borate in the composition of Example V is replaced by one-half of zinc borate.

Example IX

A wood-preserving composition according to the invention is prepared from one mole of copper borate, one mole of potassium bichromate, and two moles of sodium bisulfate, without any excess of boron. The potassium ions of the bichromate are neutralized in aqueous solution by the excess of sulfate ions from the sodium bisulfate. The composition contains the following components:

21.8% _____ $Cu(BO_2)_2$.
43.0% _____ $K_2Cr_2O_7$.
35.2% _____ $NaHSO_4$ (Anhydrous).

The copper borate in the above composition may be replaced entirely or partially by zinc borate or manganese borate.

Example X

In the composition of Example IX, the copper borate is replaced by the same molar amount of copper tetraborate. The composition thus consists of one mole of $CuB_4O_7$, one mole of potassium bichromate, and two moles of sodium bisulfate, and thus contains an excess of two gram atoms of boron. Its percentage composition is:

| | |
|---|---|
| 29.0% | $CuB_4O_7$. |
| 39.1% | $K_2Cr_2O_7$. |
| 37.9% | $NaHSO_4$. |

The copper tetraborate in the above composition may be replaced by manganese tetraborate or zinc tetraborate.

*Example XI*

A wood-preserving composition according to the invention is prepared from one mole of zinc oxide, 2.1 moles of chromic acid, and three moles of boric acid. The intimate mixture of the crystalline components contains an excess of one mole of boric acid over the amount stoichiometrically required for the formation of metal borate. The composition thus contains:

| | |
|---|---|
| 17.1% | ZnO. |
| 44.0% | $CrO_3$. |
| 38.9% | $B(OH)_3$. |

*Example XII*

Zinc oxide in Example XI is replaced by the equivalent amount of zinc hydroxide.

*Example XIII*

Zinc oxide in the composition of Example XI is replaced by the corresponding molar amount of zinc carbonate.

*Example XIV*

Zinc oxide in the composition of Example XI is replaced by cupric oxide.

*Example XV*

Zinc oxide in the composition of Example XI is replaced by cupric hydroxide.

*Example XVI*

Zinc oxide in the composition of Example XI is replaced by copper carbonate ($CuCO_3$).

*Example XVII*

A wood-preserving agent according to the invention is prepared from one mole of copper oxide, one mole of potassium bichromate, one mole of boric acid anhydride, and two moles of sodium bisulfate, which latter is added to neutralize the potassium content of the bichromate upon dissolution in water in the form of neutral potassium sulfate. The composition contains the following percentage amounts of the components:

| | |
|---|---|
| 11.6% | CuO. |
| 43.1% | $K_2Cr_2O_7$. |
| 35.2% | $NaHSO_4$ (anhydrous). |
| 10.1% | $B_2O_3$. |

In the composition of Example XVII, copper oxide may be replaced by copper carbonate, copper hydroxide, or the corresponding zinc compounds.

*Example XVIII*

Copper oxide in the composition of Example XVII is replaced by manganous carbonate ($MnCO_3$).

*Example XIX*

A wood-preserving agent according to the invention is prepared from one mole of zinc sulfate, two moles of boric acid, and one mole of potassium bichromate. The percentage amount of its components is:

| | |
|---|---|
| 30.0% | $ZnSO_4 \cdot H_2O$. |
| 20.7% | $B(OH)_3$. |
| 49.3% | $K_2Cr_2O_7$. |

The composition can be used for impregnating pine or spruce wood by, for instance, the known osmotic paste process.

Zinc sulfate in the above composition can be replaced by zinc chloride, zinc nitrate, cupric sulfate, cupric chloride, cupric nitrate, manganous sulfate, manganous chloride, or manganous nitrate.

*Example XX*

In the composition of any one of the preceding Examples V to VIII, XI to XVI or XIX, orthoboric acid is replaced by metaboric acid.

*Example XXI*

In the composition of any one of the preceding Examples V to VIII, XI to XVI or XIX, orthoboric acid is replaced by boric anhydride ($B_2O_3$).

It is also possible to replace boric acid in the aforesaid examples by the stoichiometrically corresponding amount of an alkali metal borate in mixture with an equivalent amount of an acid, for instance, sulfuric acid.

*Example XXII*

In the composition of Examples V to VIII, XI to XIX, boric acid or boric acid anhydride is replaced by one mole of sodium borate in mixture with an equivalent amount of sulfuric acid.

*Example XXIII*

The molar amount of sodium bisulfate used in the compositions of Examples IX, X, and XVII is replaced by an equivalent amount of sulfuric acid.

*Example XXIV*

The molar amount of sodium bisulfate used in the compositions of Examples IX, X, and XVII is replaced by an equivalent amount of hydrochloric acid.

*Example XXV*

The molar amount of sodium bisulfate used in the compositions of Examples IX, X, and XVII is replaced by an equivalent amount of sodium or potassium pyrosulfate.

*Example XXVI*

In the composition of Examples IX, X and XVII to XIX potassium bichromate is replaced by a corresponding molar amount of sodium monochromate.

*Example XXVII*

In the composition of Examples IX, X and XVII to XIX potassium bichromate is replaced by a corresponding molar amount of sodium bichromate.

Some of the heavy metal borates are not suitable for use in the compositions according to my invention, because the heavy metal cations of these compounds would form insoluble chromates in chromic acid, thus causing a premature precipitation when preparing an impregnating solution with the agent. Such borates are, in the first line, lead borate and mixtures of lead salts with boric acid and chromic acid.

The wood-preserving agents according to the invention present difficultly lixiviable protective agents for wood, the fungicidal activity of which is comparable with that of the most effective known agents. Moreover, due to the acidic pH value of their aqueous solutions, these agents do not unduly attack the impregnated wood, even in the presence of copper. Another decisive advantage of the wood-preserving agents according to the invention resides in their low toxicity against warm-blooded animals and in their universal applicability to all known modern impregnating methods.

It will be understood that this invention is susceptible to further modification and, accordingly, it is desired to comprehend such modifications within this invention as may fall within the scope of the appended claims.

I claim:

1. A wood-preserving agent consisting essentially of proportionately, (a) one mole of at least one heavy metal borate selected from the group consisting of copper borate, zinc borate, and manganese borate, and (b) $x$ moles of chromic acid, wherein $x$ is a value between 1.8 and 3.

2. A wood-preserving agent consisting essentially of, proportionately, (a) one mole of at least one water-insoluble heavy metal borate selected from the group consisting of copper borate, zinc borate, and manganese borate, (b) $x$ moles of chromic acid, and (c) up to $2x$ moles of boric acid, wherein $x$ is a value between 1.8 and 3.

3. A wood-preserving agent consisting essentially of, proportionately, (a) one mole of at least one inorganic heavy metal compound soluble in chromic acid and selected from the group consisting of the oxides, hydroxides and carbonates of bivalent zinc, copper and manganese, (b) from 2 to $(2x+2)$ moles of a borate ion source selected from the group consisting of free boric acid, boric anhydride, and equivalent mixtures of $Me^I$ borate and a non-reducing inorganic acidic substance selected from the group consisting of sulfuric acid, sodium bisulfate, ammonium bisulfate, potassium bisulfate, sodium pyrosulfate, potassium pyrosulfate, ammonium pyrosulfate, hydrochloric acid, nitric acid, and hydrofluoric acid, wherein $Me^I$ is a monovalent cation selected from the group consisting of sodium, potassium and ammonium, and (c) $x$ moles of chromic acid, $x$ being a number between 1.8 and 3.

4. A wood-preserving agent consisting essentially of, proportionately, (a) one mole of at least one inorganic heavy metal compound soluble in chromic acid and selected from the group consisting of the oxides, hydroxides and carbonates of bivalent zinc, copper and manganese, (b) from 2 to $(2x+2)$ moles of a borate ion source selected from the group consisting of free boric acid, boric anhydride, and equivalent mixtures of $Me^I$ borate and an inorganic acidic substance selected from the group consisting of sulfuric acid, sodium bisulfate, ammonium bisulfate, potassium bisulfate, sodium pyrosulfate, potassium pyrosulfate, ammonium pyrosulfate, hydrochloric acid, nitric acid, and hydrofluoric acid, wherein $Me^I$ is a monovalent cation selected from the group consisting of sodium, potassium and ammonium, and (c) $x$ moles of a chromium-containing salt of $Me^I$ with an anion selected from the group consisting of $CrO_4''$ and $Cr_2O_7''$ and a non-reducing inorganic acidic substance selected from the group consisting of sulfuric acid, sodium bisulfate, ammonium bisulfate, potassium bisulfate, sodium pyrosulfate, potassium pyrosulfate, ammonium pyrosulfate, hydrochloric acid, nitric acid, and hydrofluoric acid, $x$ being a number between 1.8 and 3.

5. A wood-preserving agent consisting essentially of, proportionately, (a) one mole of at least one inorganic heavy metal compound soluble in chromic acid selected from the group consisting of the nitrates, sulfates and chlorides of bivalent zinc, copper and manganese, (b) from 2 to $(2x+2)$ moles of a borate ion source selected from the group consisting of free boric acid, boric anhydride, and equivalent mixtures of $Me^I$ borate and a non-reducing inorganic acidic substance selected from the group consisting of sulfuric acid, sodium bisulfate, ammonium bisulfate, potassium bisulfate, sodium pyrosulfate, potassium pyrosulfate, ammonium pyrosulfate, hydrochloric acid, nitric acid, and hydrofluoric acid, which $Me^I$ is a monovalent cation selected from the group consisting of sodium, potassium and ammonium, and (c) $x$ moles of a chromium-containing salt of $Me^I$ with an anion selected from the group consisting of $CrO_4''$ and $Cr_2O_7''$ and a non-reducing inorganic acid other than arsenic and phosphoric acid, $x$ being a number between 1.8 and 3, whereby the acid formed hydrolytically from said one mole of heavy metal compound upon dissolution of the agent in water can be neutralized by the cations from one mole of said $x$ moles of chromium-containing salt.

6. A wood-preserving agent consisting of, proportionately, (a) one mole of at least one inorganic heavy metal compound soluble in chromic acid selected from the group consisting of the nitrates, sulfates and chlorides of bivalent zinc, copper and manganese, (b) from 2 to $(2x+2)$ moles of a borate ion source selected from the group consisting of free boric acid, boric anhydride, and equivalent mixtures of $Me^I$ borate and a non-reducing inorganic acidic substance selected from the group consisting of sulfuric acid, sodium bisulfate, ammonium bisulfate, potassium bisulfate, sodium pyrosulfate, potassium pyrosulfate, ammonium pyrosulfate, hydrochloric acid, nitric acid, and hydrofluoric acid, which $Me^I$ is a monovalent cation selected from the group consisting of sodium, potassium and ammonium, (c) $x$ moles of chromic acid, $x$ being a number between 1.8 and 3, and (d) 1 mole of $Me^I$ tetraborate for neutralizing the acid hydrolytically formed from said one mole of heavy metal compound upon dissolution of the agent in water.

7. A wood-preserving agent consisting of, proportionately, (a) one mole of at least one inorganic heavy metal compound soluble in chromic acid selected from the group consisting of the nitrates, sulfates and chlorides of bivalent zinc, copper and manganese, (b) from 2 to $(2x+2)$ moles of a borate ion source selected from the group consisting of free boric acid, boric anhydride, and equivalent mixtures of $Me^I$ borate and a non-reducing inorganic acidic substance selected from the group consisting of sulfuric acid, sodium bisulfate, ammonium bisulfate, potassium bisulfate, sodium pyrosulfate, potassium pyrosulfate, ammonium pyrosulfate, hydrochloric acid, nitric acid, and hydrofluoric acid, which $Me^I$ is a monovalent cation selected from the group consisting of sodium, potassium and ammonium, (c) $x$ moles of chromic acid, $x$ being a number between 1.8 and 3, and (d) 2 moles of $Me^I$ metaborate for neutralizing the acid hydrolytically formed from said one mole of heavy metal compound upon dissolution of the agent in water.

References Cited in the file of this patent

UNITED STATES PATENTS

| | | |
|---|---|---|
| 1,346,830 | Lamberg | July 20, 1920 |
| 1,994,073 | Hartman et al. | Mar. 12, 1935 |
| 2,041,655 | Gunn | May 19, 1936 |
| 2,149,332 | Boller | Mar. 7, 1939 |